Figure 5:
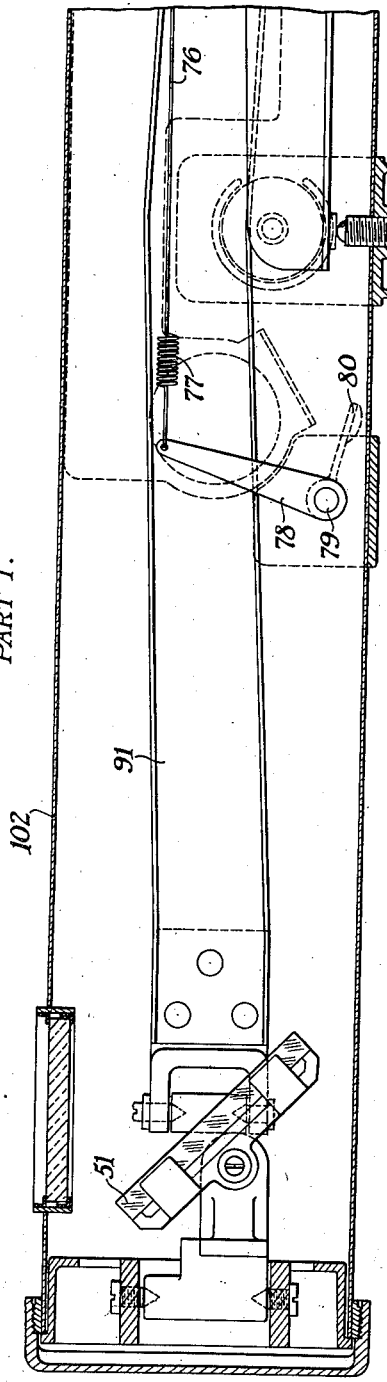

June 4, 1946.  J. MIHALYI  2,401,705
RANGE FINDER
Filed March 13, 1943  6 Sheets-Sheet 1
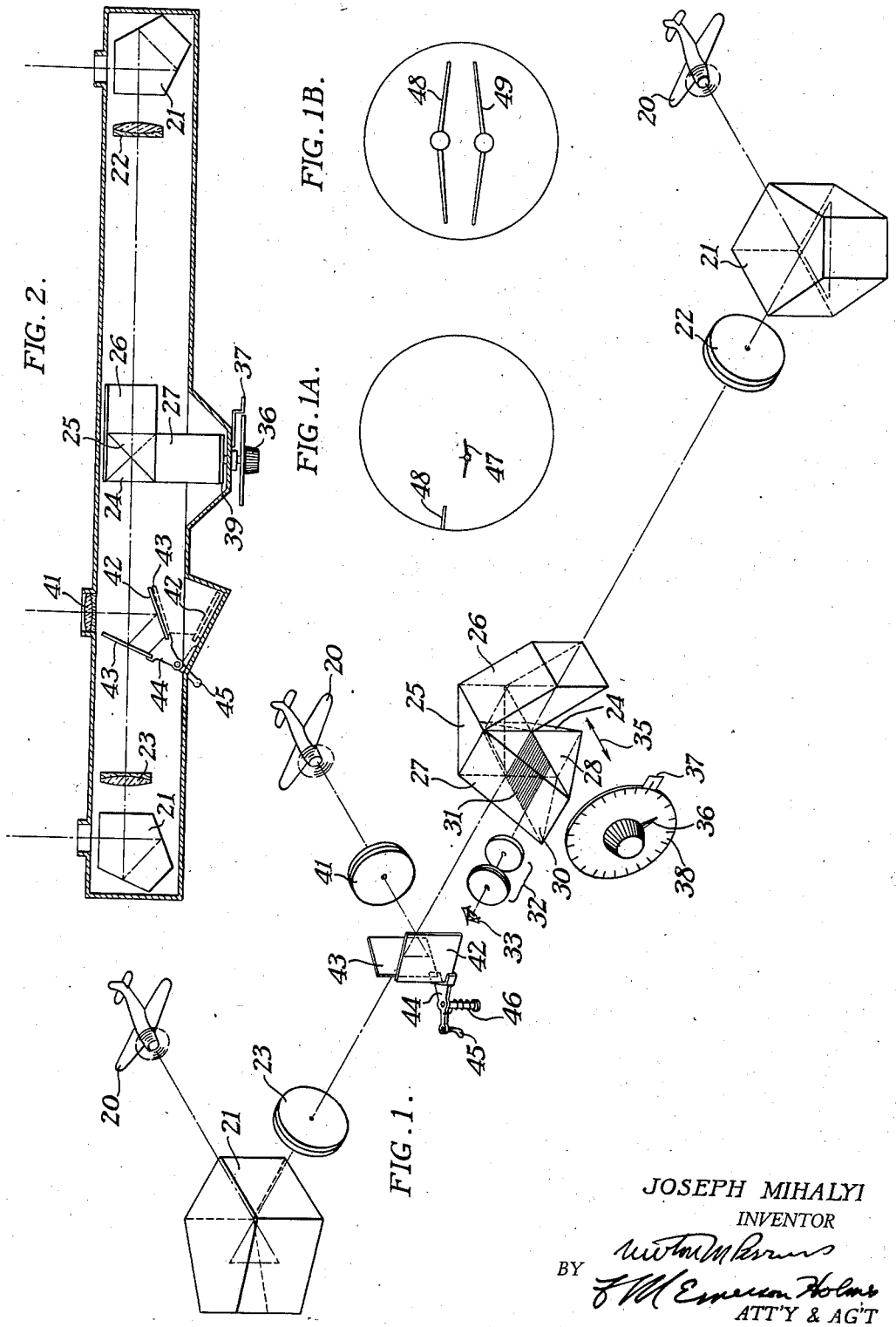
JOSEPH MIHALYI
INVENTOR
BY
ATT'Y & AG'T

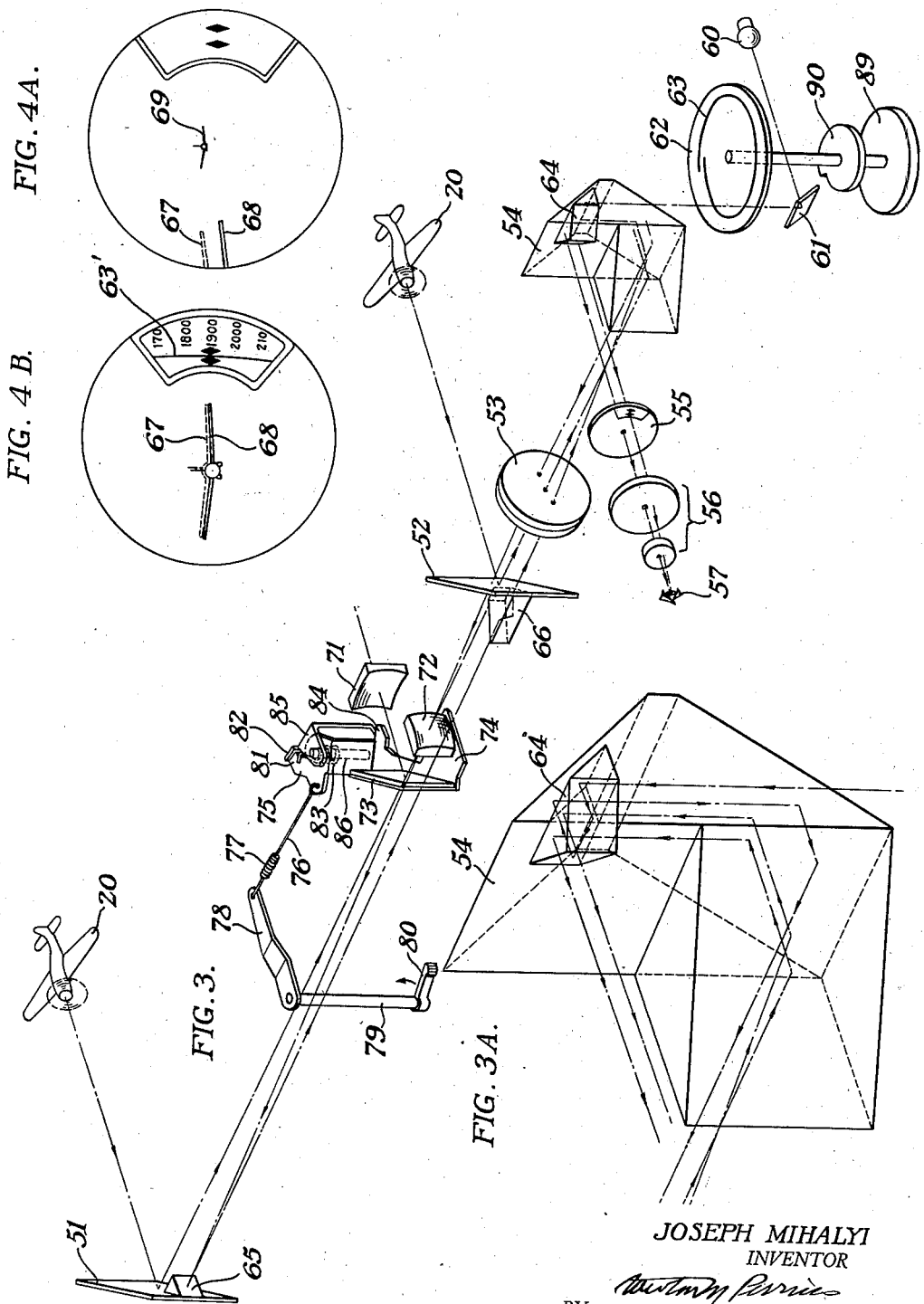

June 4, 1946.	J. MIHALYI	2,401,705
RANGE FINDER
Filed March 13, 1943	6 Sheets-Sheet 3

PART 1.

PART 1.

JOSEPH MIHALYI
INVENTOR

BY
ATT'Y & AG'T

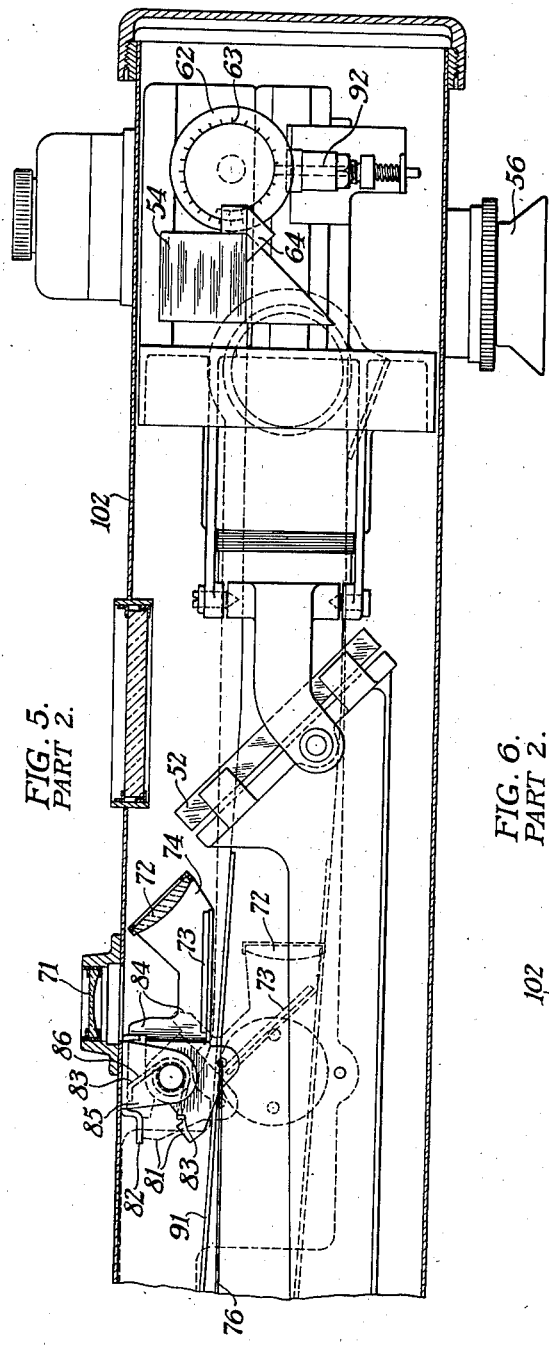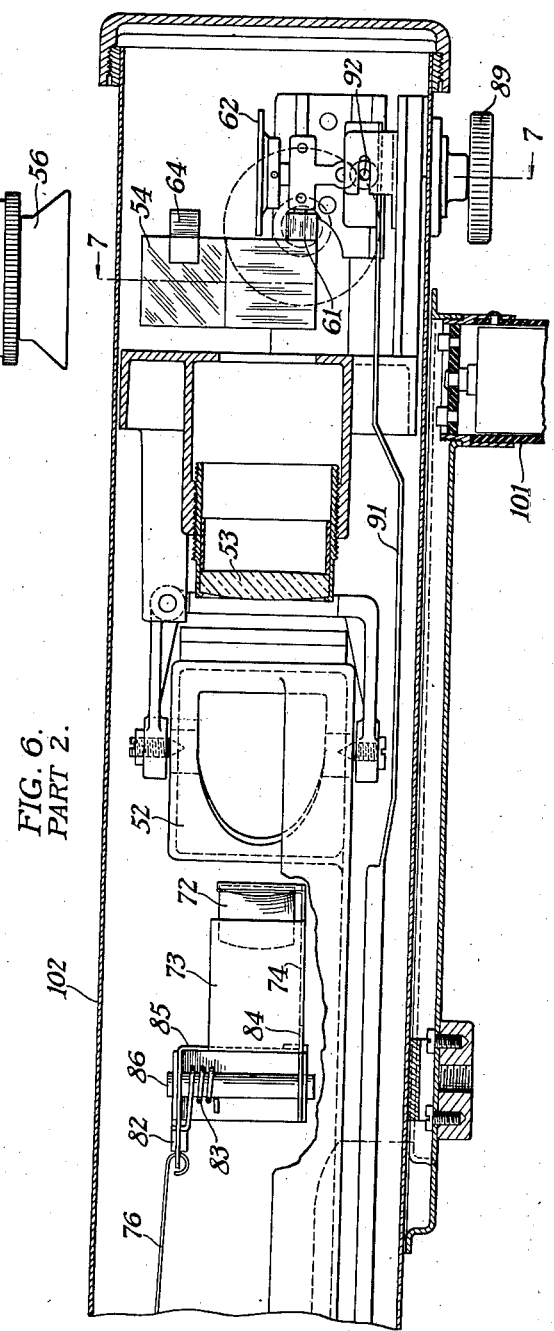

June 4, 1946.   J. MIHALYI   2,401,705
RANGE FINDER
Filed March 13, 1943   6 Sheets-Sheet 5

JOSEPH MIHALYI
INVENTOR
BY
ATT'Y & AG'T

June 4, 1946.   J. MIHALYI   2,401,705
RANGE FINDER
Filed March 13, 1943   6 Sheets-Sheet 6
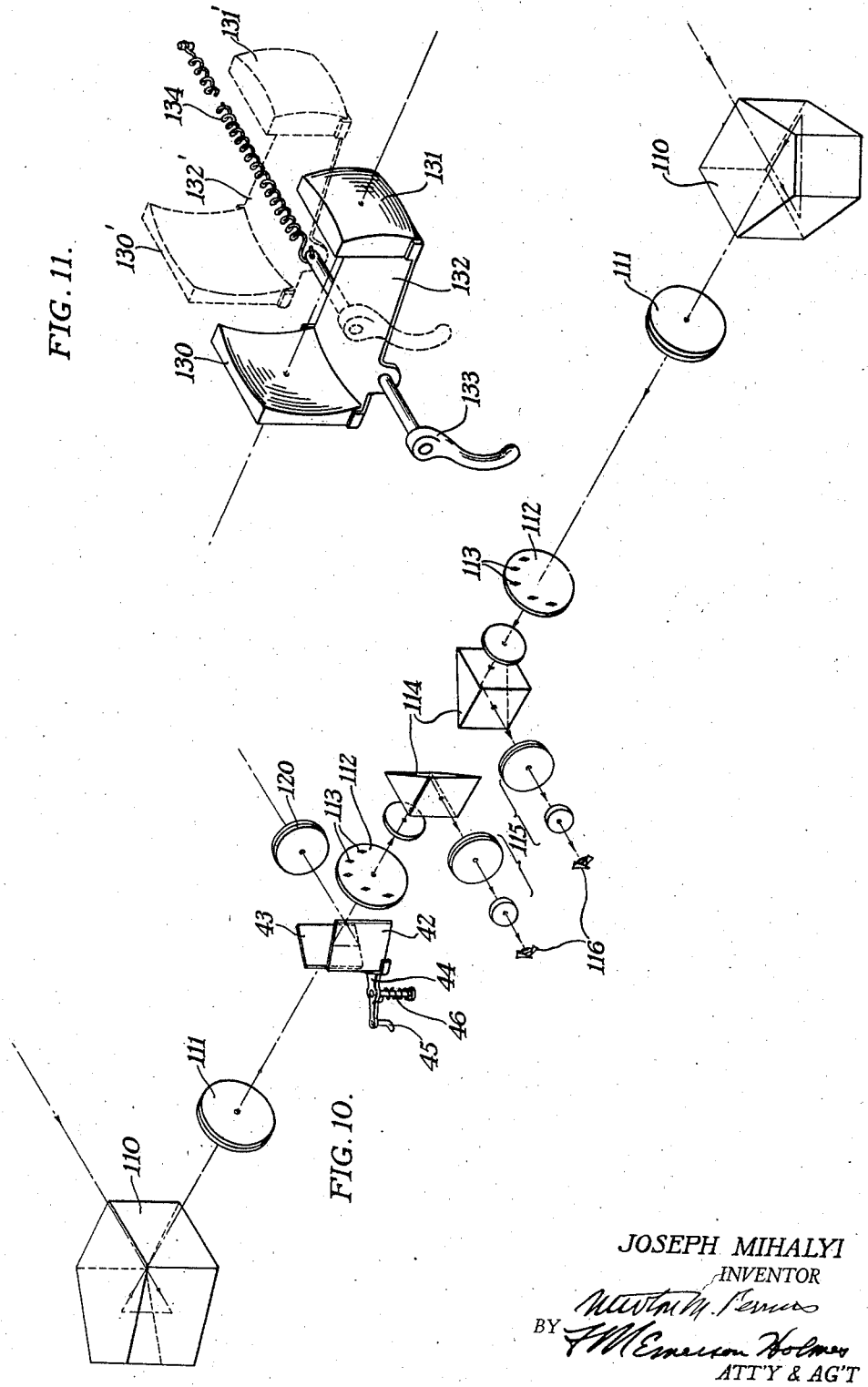
JOSEPH MIHALYI
INVENTOR
ATT'Y & AG'T Patented June 4, 1946

2,401,705

UNITED STATES PATENT OFFICE 2,401,705

RANGE FINDER

Joseph Mihalyi, Rochester, N. Y., assignor to Eastman Kodak Company, Rochester, N. Y., a corporation of New Jersey Application March 13, 1943, Serial No. 479,097

14 Claims. (Cl. 88—2.7)

This invention relates to range finders.

This is Case G of a series of applications relating to this same subject. The series includes the following:

| Title | Serial No. | Filed | Inventors |
| --- | --- | --- | --- |
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,186 | Oct. 29, 1943 | MacNeille. |

The present Case G is not limited in any way to autocollimating range finders such as described in other cases of this series, but is applicable to all range finders in which one or more objectives are used for forming in comparison planes, images of the object being ranged. The present invention is particularly useful however with autocollimating range finders since both features are fundamentally time savers. In coincidence range finders the comparison planes are coplanar and in stereo range finders the comparison planes are viewed separately by the two eyes of the observer. In all range finders of this general type it is advantageous to have relatively high magnification to give large images for concidence or stereo comparison. Such large magnification is accompanied by a relatively small field of view so that considerable time is often consumed in attempting to get the object being ranged within the field of view of the finder.

The present invention has for its object the provision of means to permit rapid sighting of the finder which, of course, is of utmost importance when ranging on an aeroplane, for example, at which time every moment counts.

Specifically it is an object of the invention to provide a wide field of view in a range finder, without interfering with the magnification necessary for easy judging of coincidence or stereo depth.

It is an object of a preferred embodiment of the invention to provide this wide field of view momentarily until the finder is aligned and to permit the wide field providing means to be out of the way while actually ranging.

On the other hand, when applied to camera range finders, the opposite is required since only momentary ranging is usually needed and the view finding must be more carefully executed.

According to the present invention these objects are provided by inserting in the optical system of a range finder a wide field producing means which is positionable in and out of the optical system. The image formed while this auxiliary system is inserted, is, of course, of lower magnification. The normal operation of the device is to hold the view finder in position until the small image of the areoplane, for example, is brought into the field of view and fairly well centered. At this time, one of the viewing point images and possibly the other, if the auxiliary viewer does not interfere completely with one of the range finder beams, are also centered in the field. The auxiliary viewer is then allowed to snap out of the range finder system and the two relatively large images are compared for ranging in the normal way.

There are two main forms of this invention depending on whether the auxiliary viewer is positioned in a collimated beam or in a converging beam following one of the range finder objectives. If a single objective is used, the invention preferably takes the form of an inverted Galilean telescope inserted in at least one of the collimated beams entering the single objective. Of course, the light from the object being ranged entering the auxiliary finder system need not be the same as that entering either of the viewing points of the range finder. In fact, in general the finder system has a separate viewing point so that its field of view is independent of the apertures imposed on the regular range finder viewing points.

The second species of the invention is particularly useful with coincidence or stereo range finders which have two relatively long focal length objectives positioned near the viewing points of the range finder. According to this species of the invention an objective of shorter focal length is positioned to receive light at a third viewing point and to focus it in one of the comparison planes. Thus this auxiliary objective is between one of the main objectives and its comparison plane. In actual practice this is best accomplished by having the short focal length objective facing toward the object being ranged and at an intermediate viewing point and by having a reflector which is normally to one side of the range finder optical system but which may be inserted in one of the range finder beams to reflect to the comparison plane light which passes through this auxiliary objective.

Preferably all of the auxiliary finder system is normally to one side of the range finder optical system and part or all of the auxiliary system is insertable in the range finder system momentarily for viewing. The part which is insertable in the range finder system is preferably urged out of the range finder system by some spring means against the force of which the viewer is moved manually for momentary viewing.

Having a third viewing point between the main two, is preferable whatever type of range finder or viewer is used since it permits more compact arrangement of the invention and permits the viewer to be operated by hand while supporting the instrument by the same hand. I find that most rapid operation of the instrument is attainable when the main images of the object being ranged are both visible, although one of them only partly, while the viewer is being operated.

In one preferred embodiment of the invention the range finder is provided with two handles adjacent to one of which is located a button or lever which may be operated to move the viewer system into position and to hold it there against this spring force.

The ranging knob may be near either of the handles since ranging is done after the viewer is released but preferably is near the other handle so that the operator may begin ranging even before the viewer system is allowed to move out of the way. Applications, Serial Numbers 461,584 and 461,585 mentioned above are drawn to such features but not in combination with the present main invention.

Figure 6:
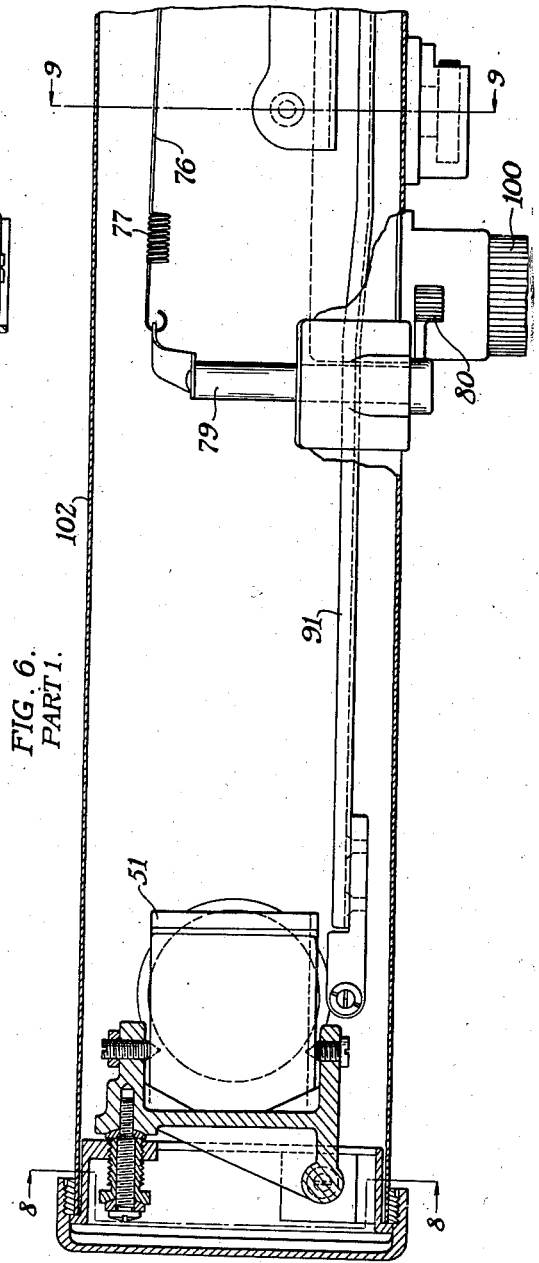
Figure 7:
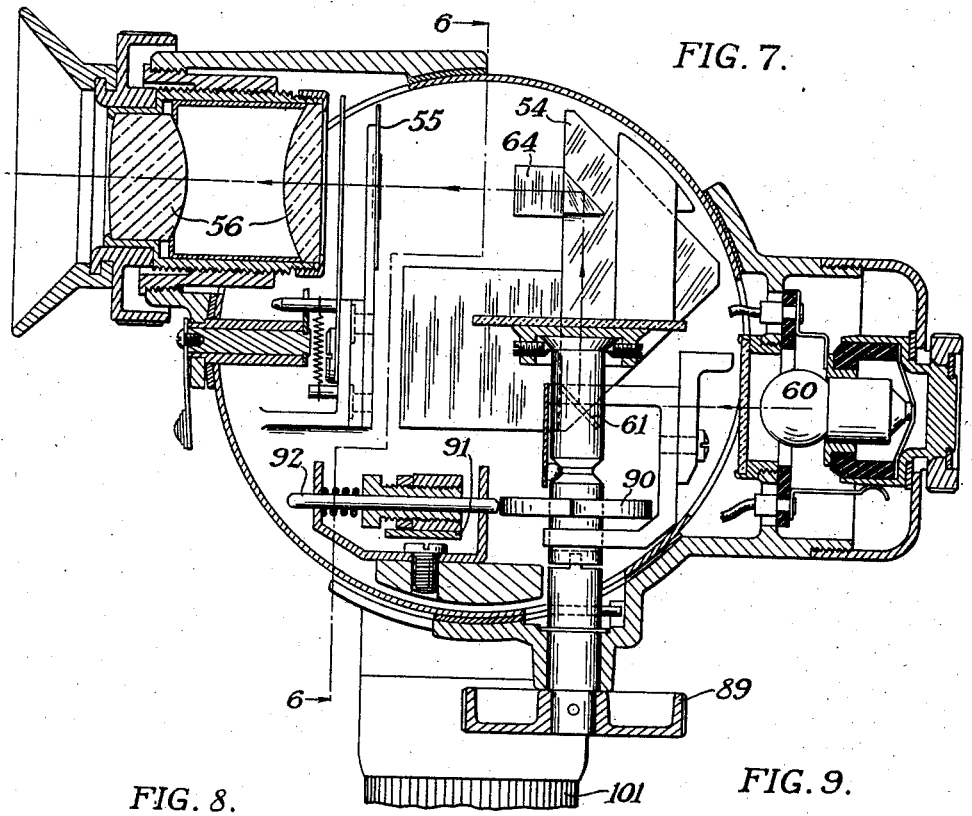
Figures 8, 9:
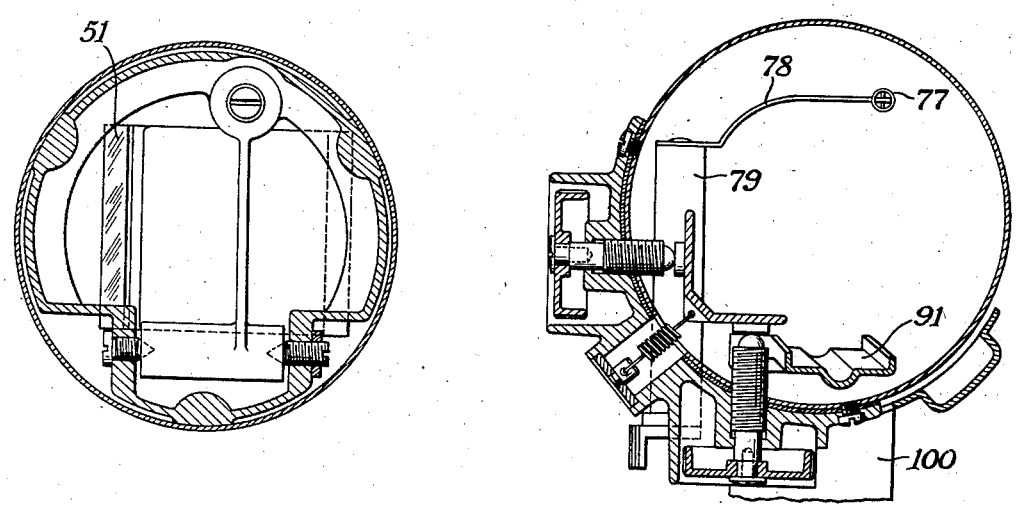

Other objects and advantages of the invention and the method of operation thereof will be fully understood from the following description when read in connection with the accompanying drawings, in which:

Fig. 1 is a perspective view of the optical system of one embodiment of the invention, Figs. 1A and 1B being the views through the eyepiece of the instrument respectively when view finding and when ranging, Fig. 2 is a plan view of a range finder incorporating the optical system shown in Fig. 1, Fig. 3 illustrates another embodiment of the invention applied to a single objective range finder, Fig. 3A being an enlarged view of one detail of the system shown in Fig. 3, Figs. 4A and 4B are views through the eyepiece of the system shown in Fig. 3 respectively when view finding and when ranging, Figs. 5 and 6, each shown in two parts for clarity, are respectively plan and elevation views partly in section of a range finder incorporating the optical system shown perspectively in Fig. 3, Figs. 7, 8 and 9 are vertical cross sections at different points along the finder shown in Figs. 3 to 6, Fig. 10 is a perspective view of a stereo range finder incorporating the invention, Fig. 11 shows a detail alternative to one included in Fig. 3.

In the embodiment of the invention shown in Figs. 1 and 2 light from a distant object represented by small aeroplanes 20 is directed toward comparison planes by pentaprisms 21 and is brought to focus in those planes by objectives 22 and 23. Light from objective 22 enters a rhomb 26 and is reflected by a prism 25 and another prism 27 down to the mirrored half 31 of an interface in the prism assembly, whence it is reflected upward to a comparison plane at a slight angle to this surface 31 which comparison plane is viewed through an eyepiece 32 by the eye 33 of an observer. Similarly, light from the objective 23 is reflected by a prism 24 and another prism 28 upward through a clear area 30 in the interface described above and thence through the eyepiece 32. To permit the range finder to be adjusted for coincidence, the prism unit is carried by a support 39, shown best in Fig. 2, and is moved in the direction indicated by the double headed arrow 35 (Fig. 1) by rotating the knob 36. When the images 48 and 49 are in coincidence as shown in Fig. 1B the range may be read by an index 37 against a scale 38 carried by the knob 36.

Of course, the images 48 and 49 are quite large and the field of view of the instrument is relatively small so that it is difficult to align the range finder on the object being ranged, in the split second available for ranging an aeroplane. According to the invention, an auxiliary objective 41 of shorter focal length is positioned at an intermediate viewing point. In order to find-the-view and line-up the range finder, an optical square comprising mirrors 42 and 43 carried by a support 44 is held, against the force of a spring 46, in the range finder beam coming from the objective 23. Light from the objective 41 striking the mirrors 42 and 43 is brought to focus in the comparison plane giving an image 47 as shown in Fig. 1A. The auxiliary system is held in this position by the finger of the operator engaging a small grip 45 on the mount 44. The field of view of the objective 41, as defined in the comparison plane seen through the eyepiece 32, is many times larger than that of the objective 23. In fact, since the field of view of the eyepiece 32 is the limiting factor, the field of view is increased by the same factor that the magnification is decreased. To operate the device, the auxiliary finder system is held as shown in Fig. 1 and as shown by solid lines in Fig. 2 until the image 47 is seen and is brought more or less to the center of the field by orienting the whole instrument properly. As soon as the image 47 is somewhere in the center of the field, at which time the image 48 starts to come into the field of view, the grip 45 is released and the mirrors 42 and 43 swing, under the action of the spring 46, to one side of the range finder beam as shown in dotted lines in Fig. 2. At this time it is quite easy to range the object.

In Figs. 3 to 9 light from the object being ranged is reflected by a rotatable mirror 51 to form one range finder beam which is practically collimated and by a semi-transparent mirror 52 to form the other range finder beam which is also collimated. These two range finder beams are brought to focus by a simple objective 53 and an erecting prism 54 to form images 67 and 68 in coplanar comparison planes on a disk 55 located at the focus of an eyepiece 56 through which the eye 57 of an observer may view the images. Coincidence is obtained by rotating the mirror 51 by means of a lever 91, best seen in Figs. 5 and 6, which carries a cam follower 92 (Fig. 7), which engages a cam 90 which may be rotated manually by knob 89. Rotation of this same knob rotates a disk 62 which carries a coincidence line 63 and a scale, all of which are described in detail in Cases E and F of this series. Light from a lamp 60 as reflected by mirror 61, passes upward through the coincidence line 63 and is reflected by a small erecting prism 64 into the optical system of the range finder. This light is collimated by objective 53 and is then reflected by a prism 65 cemented to the mirror 51, and a dove prism 66 cemented to the semi-transparent mirror 52, back through the objective 53 to form an image 63' in the comparison planes.

According to the invention an auxiliary finder system is provided in the form of an inverted Galilean telescope consisting of a negative lens 71 at a viewing point intermediate to those of the range finder, a mirror 73 and a positive lens 72. When the auxiliary system is arranged as shown in Fig. 3 and as shown by broken lines in Fig. 5, part 2, an image 69 shown in Fig. 4A, of reduced size is formed in the comparison plane. This small image permits the object to be brought into the field of view and fairly well centered. It will be noted in Fig. 4A that no image 63' of the coincidence line is seen because when finding the field of view, there is no point in turning on the lamp 60. Also, both images 67 and 68 are visible in Fig. 4A, but one of them is of diminished intensity because the mirror 73 and lens 74 interfere with part of the collimated beam from the mirror 51. However, all of the beam is not so interrupted and it is quite possible to get coincidence while the small image 69 is still in the field of view. However, it is preferable to let this small image go as soon as the instrument is aligned and this is provided by allowing the auxiliary system to move to one side of the object beam. The lens 72 and the mirror 73 are carried by a support 74 which consists of a lower portion part of which constitutes a stop 84 and an upper portion 75 both of which portions engage a vertical rod 86 to rotate thereon. The rod 86 is supported by a member 85 fastened to the housing 102 of the range finder and having two detents, one of which is the side of the member 85 to engage the stop 84 when the auxiliary system is moved to one side of the range finder system and the other, 82, arranged to engage a stop 81 which consists of part of the member 75, when the auxiliary system is moved into the position shown in Fig. 3 and by broken lines in Fig. 5. A wire shaped member 76 having a spring shock absorber 77 therein engages the member 75 so that, against the force of a spring 83 which engages both the support 85 and the member 75, it can pull the member 75 and the support 74 together with the lens 72 and mirror 73 into the position shown in Fig. 3. This operation is provided by an arm 78 carried by a shaft 79 which may be rotated by pressure on a button 80.

The button 80 is located near one of the handles 100 of the instrument so that the button 80 may be operated momentarily by the left thumb of the operator and then released as soon as the instrument is properly aligned. At this time the spring 83 rotates the member 74 and 75 until the stop 84 strikes the edge of the support 85 and holds the auxiliary system in the position shown by solid lines in Fig. 5, part 2. At this time the right hand of the operator holding the other handle 101 of the instrument operates the knob 89 for ranging.

A stereoscopic range finder is shown in Fig. 10 in which light from the object being ranged is received by pentaprisms 110 and is focused by objectives 111 in comparison planes 112 carrying stereo fiducial marks 113 which indicate the range. The object images thus formed and the stereo marks 113 are viewed binocularly by prisms 114 and eyepieces 115 by the right and left eyes 116 of an observer. According to the invention an auxiliary objective 120 of shorter focal length than the objective 111 is positioned at an intermediate viewing point to send light to the left eye image plane by means of a removable mirror system made up of mirrors 42 and 43 identical in construction and operation to those shown in Fig. 1.

Fig. 11 illustrates a less preferable embodiment of the invention in which the collimated beam from the mirror 51 of Fig. 3 forms the view finder beam. That is, the view finder system uses the same viewing point as one of the range finder beams. In Fig. 11 a negative lens 130 and a positive lens 131 are carried by a support 132 which is normally held, by a spring 134, to one side of the collimated beam coming from the mirror 51 of Fig. 3. This inverted Galilean telescope may be moved against the force of the spring 34 by pressure on a handle 133 so that it intercepts the collimated beam and introduces decreased magnification with a wider field of view. However, the field of view is then limited by the aperture of the viewing point near the mirror 51 and does not necessarily fill the viewing plane 55, at this lower magnification. Thus the auxiliary viewing point arrangement shown in Fig. 3 is preferable although the arrangement in Fig. 11 is somewhat simpler.

Having thus described the preferred embodiments of my invention, I wish to point out that it is not limited to these structures but is of the scope of the appended claims.

What I claim and desire to secure by Letters Patent of the United States is:

1. A range finder of the type having two spaced viewing points at which substantially collimated beams of light are received from the object being ranged, an optical system including at least one objective for directing and focusing the two collimated beams forming images in comprison planes and a ranging adjuster, said range finder being characterized by means insertable alternatively in and out of said optical system for forming a real image of the object at lower magnification in one of said planes while inserted in said system to produce a wider field of view.

2. A range finder according to claim 1 in which said wider field producing means is an inverted Galilean telescope insertable in at least one of said collimated beams.

3. A range finder according to claim 1 in which said wider field producing means includes an auxiliary positive objective of shorter focal length than the first mentioned objective and reflecting means in alignment with the auxiliary objective for reflecting light from the object being ranged into focus in one of the planes without going through said first mentioned objective.

4. A range finder according to claim 1 including spring means for urging at least part of said wider field producing means out of said optical system and manually operable means for moving said part into said optical system against the spring urging force.

5. A range finder according to claim 1 including a third viewing point between the other two for receiving collimated light from the object being ranged, at least one lens positioned at said third viewing point constituting part of said wider field producing means and a reflector constituting said insertable means movable alternatively to two positions in one which it is optically ineffective relative to the range finder and in the other of which it receives light from the third viewing point and reflects it to one of the comparison planes.

6. A range finder according to claim 1 in which one of the object beams is unaffected by the wider field producing means and the other object beam is only partly cut off while the wider field producing means is in said system.

7. A single objective range finder of the type having two viewing point reflectors for reflecting beams from the object being ranged into alignment through an objective to form real images for comparison characterized by an inverted Galilean telescope positionable between the reflectors in one of the beams for giving an image of the object of lower magnification than that produced by the other beams and means for moving said telescope to one side of said one of the beams.

8. A range finder according to claim 7 in which the telescope includes a reflector and has its front lens facing the object when in said one of the beams.

9. A range finder according to claim 7 in which spring means urge said telescope to one side of said one of the beams and manually operable means are provided for holding the telescope in said beam against the force of the spring means.

10. A range finder of the type having two viewing points at which beams of light are received from the object being ranged and two relatively long focal length objectives for forming in comparison planes images of the object being ranged characterized by a relatively short focal length objective at a viewing point between the other two and reflecting means positionable in one of the object beams to reflect a third object beam through the short focal length objective toward, and into focus in, one of the comparison planes and means for moving and holding out of said one of the beams at least all of said reflecting means and short focal length objective which is positionable in said one of the beams.

11. A range finder according to claim 10 in which said comparison planes are coincident.

12. A range finder according to claim 10 in which said comparison planes are viewed stereoscopically.

13. A range finder according to claim 1 having two handles and adjacent to one of the handles manually operable means for moving said wider field producing means relative to the optical system.

14. A range finder according to claim 1 having two handles, spring means for urging at least part of said wider field producing means out of said optical system and, adjacent to one of the handles manually operable means for moving said part into the optical system against the spring urging force.

JOSEPH MIHALYI.